United States Patent
Dasan et al.

(10) Patent No.: US 8,038,764 B2
(45) Date of Patent: Oct. 18, 2011

(54) RHENIUM RECOVERY FROM SUPERALLOYS AND ASSOCIATED METHODS

(75) Inventors: Biju Dasan, Bangalore (IN); Barath Palanisamy, Coimbatore (IN); Don Mark Lipkin, Niskayuna, NY (US); Leonardo Ajdelsztajn, Niskayuna (IN); Joshua Leigh Miller, West Chester, OH (US); Srinidhi Sampath, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/626,973

(22) Filed: Nov. 30, 2009

(65) Prior Publication Data
US 2011/0126673 A1    Jun. 2, 2011

(51) Int. Cl.
C22B 7/00    (2006.01)
C22B 59/00   (2006.01)

(52) U.S. Cl. ............... 75/401; 75/353; 75/628; 423/23

(58) Field of Classification Search .......... 75/401, 75/628, 353; 423/23
See application file for complete search history.

(56) References Cited

U.S. PATENT DOCUMENTS

| | | | |
|---|---|---|---|
| 2,848,313 A * | 8/1958 | Takahashi et al. ............. | 423/1 |
| 4,604,265 A | 8/1986 | Douglas et al. | |
| 4,787,561 A * | 11/1988 | Kemp et al. .................. | 241/30 |
| 4,880,170 A * | 11/1989 | Kemp et al. .................. | 241/5 |
| 5,482,789 A * | 1/1996 | O'Hara et al. ................ | 428/652 |
| 5,776,329 A | 7/1998 | Krynitz et al. | |
| 6,131,835 A | 10/2000 | Johnson | |
| 6,835,365 B1 * | 12/2004 | Davies et al. ................. | 423/446 |
| 2003/0119658 A1 * | 6/2003 | Allison et al. ................ | 502/38 |
| 2003/0136685 A1 | 7/2003 | Stoller et al. | |
| 2008/0216606 A1 | 9/2008 | Marsden et al. | |
| 2009/0317288 A1 * | 12/2009 | Yokokawa et al. ........... | 420/448 |
| 2010/0180514 A1 * | 7/2010 | Liu ............................... | 51/309 |

OTHER PUBLICATIONS

Nadler et al. "Rhenium and Rhenium Compounds". Wiley-VCH Verlag GmgH & Co. KGaA, Weinheim. 2005.*
Ferrante, M.J. et al "Recovery of Rhenium from Tungsten-Rhenium Alloy." United States Bureau of Mines Report of Investigation No. 7022. Apr. 1969.*
Drobot et al. "Recycling of Rhenium." Rhenium and Rhenium Alloys, Proceedings of the International Symposium. pp. 119-127. Feb. 9-13, 1997.*
A.V. Tarasov, V.M. Paretsky, A.D. Besser and E.I Gedgagov; Processing of Grinding Waste of Rhenium-Containing Alloys to Manufacture Commercial-Grade Metals; TMS ( The Minerals, Metals & Materials Society) 2008; pp. 1051-1059.
B. Heshmatpour and R.E. McDonald; Recovery and Refining of Rhenium, Tungsten and Molybdenum from W-Re, Mo-Re and Other Alloy Scraps; Journal of the Less-Common Metals, 86 (1982); pp. 121-128.

* cited by examiner

*Primary Examiner* — George Wyszomierski
*Assistant Examiner* — Tima M McGuthry Banks
(74) *Attorney, Agent, or Firm* — Francis T. Coppa

(57) ABSTRACT

A method of recovering rhenium from rhenium-containing superalloy scrap is provided. The superalloy is usually a nickel-based superalloy. The method includes the steps of forming an oxidation feedstock of flaky morphology of the superalloy scrap, and oxidizing the oxidation feedstock to convert rhenium into a volatile rhenium oxide. The flaky morphology of the oxidation feedstock is achieved by increasing the surface area of the superalloy scrap.

18 Claims, 3 Drawing Sheets

RHENIUM RECOVERY FROM SUPERALLOYS AND ASSOCIATED METHODS

BACKGROUND

The invention relates generally to a method for recovering rhenium from a superalloy, e.g., from superalloy scrap. More particularly, the invention relates to a method for recovering rhenium from superalloy scrap by increasing the surface area of the superalloy scrap.

The extensive use of rhenium in fabricating high temperature alloys, its use as a catalyst in a variety of applications, its high cost, and its rarity, are important incentives for developing techniques for its recovery. (Increasing use and growing prices for rhenium are essential factors encouraging the processing of rhenium-containing wastes.) During the manufacture of rhenium containing alloys, a large quantity of machining scrap is produced. Double-component waste, such as molybdenum-rhenium or tungsten-rhenium alloys, can be readily decomposed and processed for recovering rhenium. However, most of the rhenium is contained in superalloys, especially in nickel-based superalloy waste.

Superalloys are high melting, high strength and extremely wear-resistant alloys of a comparatively large number of metals, which are used predominantly in high temperature applications, usually higher than 500 degrees Celsius. In contrast to normal alloys, superalloys are not attacked in oxidizing and corrosive environments. The technological development of superalloys is linked inextricably to gas turbines. The nickel-based superalloys are most suitable for gas turbine construction, especially aircraft turbines.

Recovery of rhenium from superalloy waste is of economic interest because it is a relatively scarce and precious metal. In some special superalloys, rhenium is found in a proportion of up to 6% by weight. However, rhenium is difficult to recycle economically, after its service life.

Most of the prior attempts have focused on pyro- and hydrometallurgical approaches for recovering rhenium from superalloys, where the superalloy is acid-digested, followed by separation of rhenium by salt precipitation or ion-exchange. However, these approaches may not always be economically suitable, because of their cost-intensive complexity, or their time-consuming nature. These processes may also result in large by-product wastes. In contrast, oxidation-based recovery of rhenium from superalloys could be a simple and efficient method. However, as understood by those of ordinary skill in the art, liberation of rhenium from superalloy waste can be an inefficient process, due in part to coarse oxidation feedstock.

It would therefore be desirable to develop new methods for efficiently recovering rhenium from metal alloys—especially superalloy feedstock material.

BRIEF DESCRIPTION

Some embodiments of the invention provide a method of recovering rhenium from rhenium-containing superalloy scrap. The superalloy is usually a nickel-based superalloy. The method includes the steps of forming an oxidation feedstock of flaky morphology of the superalloy scrap, and oxidizing the oxidation feedstock to convert rhenium into a volatile rhenium oxide. The flaky morphology of the oxidation feedstock is achieved by increasing the surface area of the superalloy scrap.

Some other embodiments of the invention provide a method of recovering rhenium from rhenium-containing superalloy scrap. The method includes the steps of forming an oxidation feedstock of flaky morphology of the superalloy scrap, and oxidizing the oxidation feedstock to convert rhenium into a volatile rhenium oxide. The flaky morphology of the oxidation feedstock is achieved by increasing the surface area of the superalloy scrap, by using a high-energy milling technique.

DRAWINGS

These and other features, aspects, and advantages of the present invention will become better understood when the following detailed description is read with reference to the accompanying drawings, wherein.

DETAILED DESCRIPTION

Figure 1:
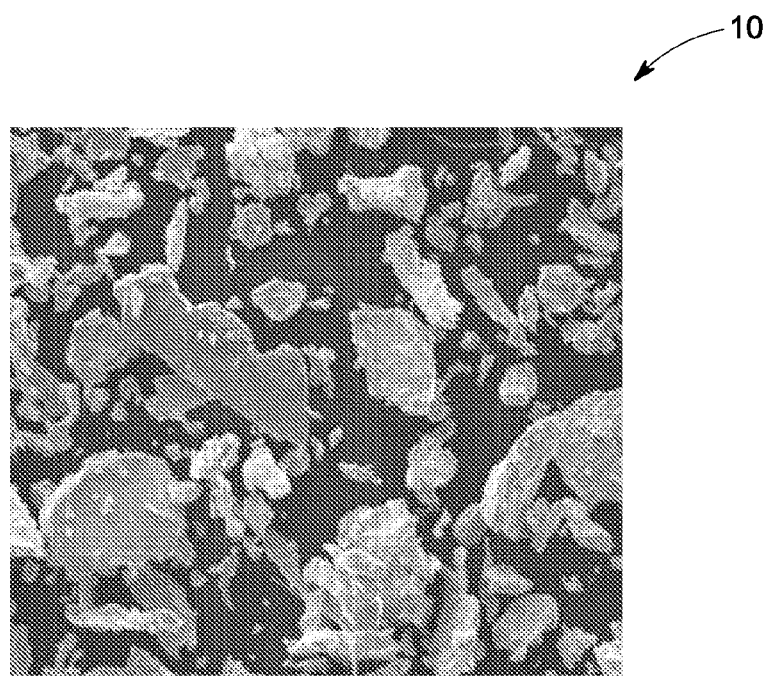
FIG. 1 is a scanning electron micrograph of as-received superalloy scrap.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims that follow, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

As discussed in detail below, some of the embodiments of the present invention provide a method of recovering rhenium from rhenium-containing superalloy scrap. These embodiments advantageously provide improved rhenium liberation that, in turn, provides more recovery of rhenium during the processing of the scrap material. The embodiments of the present invention describe a method of increasing the surface area of the superalloy scrap for improved rhenium liberation during oxidation. Though the present discussion provides examples in the context of improved rhenium liberation kinetics during oxidation, these processes can be applied to other recovery methods, such as chemical recovery methods, and electrochemical methods.

As used herein, the term "superalloy" usually refers to a nickel-base superalloy, preferably an advanced second, third or fourth generation, nickel-base single-crystal superalloy containing substantial amounts of at least one refractory metal, such as rhenium. The superalloy is substantially single-crystal in form, although small amounts of polycrystalline material are tolerated. The nickel-base superalloy is usually strengthened by the precipitation of gamma phase, gamma prime phase and/or a related phase. In some embodiments, at least about 5 weight percent aluminum is present in order to produce a sufficiently high volume fraction of the strengthening gamma' (gamma prime) phase. The rhenium content in some of these superalloys is often from about 1 to about 8 weight percent, and most preferably, from about 2 to about 6 weight percent.

A non-limiting, specific example of the superalloy is Rene®N5, having a composition, in weight percent, of 7.5 percent cobalt, 7 percent chromium, 6.2 percent aluminum, 6.5 percent tantalum, 5 percent tungsten, 1.5 percent molybdenum, 3 percent rhenium, with the balance being nickel. Optionally, some yttrium and/or hafnium may be present. Another notable example is the high-refractory single-crystal superalloy commercially known under the names Rene®N6 (U.S. Pat. No. 5,455,120), having a composition, in weight percent, of 12.5 percent cobalt, 4.5 percent chromium, 6 percent aluminum, 7.5 percent tantalum, 5.8 percent tungsten, 1.1 percent molybdenum, 5.4 percent rhenium, 0.15 percent hafnium, balance nickel. The approach of the invention is also operable with other advanced alloys, e.g., one known as "MX4", a fourth generation single-crystal superalloy disclosed in U.S. Pat. No. 5,482,789. This superalloy nominally contains, by weight, about 0.4% to about 6.5% ruthenium, about 4.5% to about 5.75% rhenium, about 5.8% to about 10.7% tantalum, about 4.25% to about 17.0% cobalt, up to about 0.05% hafnium, up to about 0.06% carbon, up to about 0.01% boron, up to about 0.02% yttrium, about 0.9% to about 2.0% molybdenum, about 1.25% to about 6.0% chromium, up to about 1.0% niobium, about 5.0% to about 6.6% aluminum, up to about 1.0% titanium, about 3.0% to about 7.5% tungsten. These alloys may contain a molybdenum+chromium+niobium content of about 2.15% to about 9.0%, an aluminum+titanium+tungsten content of about 8.0% to about 15.1%, with the balance nickel. Still other notable examples of superalloys include single-crystal superalloys commercially known under the names R142, CMSX-10, CMSX-4, and TMS-75.

According to one embodiment of the invention, a method of recovering rhenium from rhenium-containing superalloy scrap is provided. The method includes the steps of forming an oxidation feedstock of flaky morphology of the superalloy scrap, and oxidizing the oxidation feedstock to convert rhenium into a volatile rhenium oxide. The flaky morphology of the oxidation feedstock is achieved by increasing the surface area of the superalloy scrap.

As used herein, the term "superalloy scrap" refers to the waste produced on machining and grinding the superalloy, e.g., during manufacturing. The machining and grinding processes, typically, produce coarse scrap, which contains irregular particles. As received, coarse superalloy scrap from machining or grinding is generally, used as oxidation feedstock.

As used herein, the term "oxidation feedstock" refers to the superalloy scrap, which is oxidized for the recovery of rhenium.

As used herein "coarse scrap" refers to superalloy scrap having irregular particles of an average particle size at least about 50 microns. In some embodiments, the average particle size is from about 50 microns to about 80 microns, and most often, from about 50 microns to about 60 microns. FIG. 1 shows a scanning electron micrograph 10 of as-received superalloy scrap. As seen from the micrograph 10, the superalloy scrap contains irregular particles of different particle sizes.

When the coarse scrap is processed for the recovery of rhenium, a substantial amount of rhenium may not be available for processing, i.e., for the oxidation step, as described herein. This appears to be due in part to a relatively low level of rhenium-liberation from substantially large particles. As used herein, "liberation" refers to the rate of diffusion of rhenium atoms from inside of a particle towards the surface of the particle, during processing of the scrap for rhenium recovery. For a large particle of the superalloy scrap (e.g., a particle having an average largest dimension of at least about 50 microns), a diffusion distance for a rhenium atom (as defined below) is great enough to reach a surface of the particle, to be available for processing. Liberation kinetics can be improved by reducing the particle size of the rhenium, and providing substantially all of the rhenium in this reduced size, during processing. As described herein, this is made possible by increasing the surface area of the particles of the superalloy scrap.

As used herein, the term "diffusion distance" refers to the distance that a rhenium atom travels per unit time within a particle or platelets of the superalloy scrap to reach the surface of the particle.

As used herein, the term "diffusion time" or "time to diffuse" refers to the time taken by a rhenium atom to travel the diffusion distance.

As used herein, the term 'diffusivity' refers to the mass or number of rhenium atoms transferred to the surface of the particles/platelets, per unit area, per unit time.

Thus, for substantial recovery of rhenium from the superalloy scrap, embodiments of the present invention provide a method of forming an oxidation feedstock of flaky morphology, by increasing the surface area of the superalloy scrap. The oxidation feedstock of flaky morphology is achieved by grinding the superalloy scrap.

In one embodiment, grinding of the superalloy scrap is carried out by a high energy milling technique. Non-limiting examples of high-energy milling may include planetary milling, attrition milling, ball milling, airjet milling, pulveriser techniques, or a combination thereof. Other grinding techniques may be used for grinding the superalloy scrap, which provide flaky morphology. Thus, it is to be understood that any method of increasing the surface area of the superalloy scrap to achieve flaky morphology, will not depart from the scope of this invention.

Figure 2:
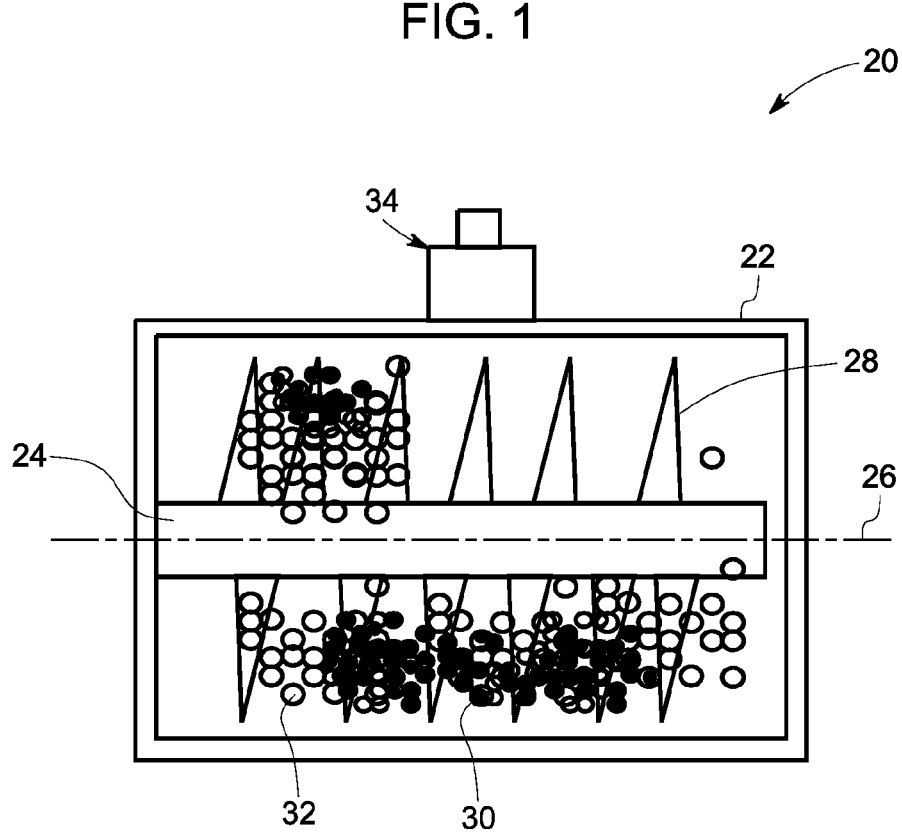
FIG. 2 is a schematic of a high energy milling technique according to an embodiment of the present invention.

In some preferred embodiments, the high energy milling technique is an attrition milling. A schematic of cross sectional view 20 of an attrition mill is shown in FIG. 2. A cylindrical chamber 22 has a rotating shaft 24 that rotates about its axis 26. The chamber 22 is partially filled with the superalloy scrap 30, along with a grinding medium (e.g., mill balls 32). In a preferred embodiment, the grinding medium 32 includes stainless steel balls. Moreover, in one embodiment, the ratio of the weight of the superalloy scrap 30 to the grinding medium 32 is at least about 1:5. In some embodiments, the ratio is in a range from about 1:5 to about 1:20, and in some specific embodiments, from about 1:10 to about 1:15. The rotating shaft 24 has impellers 28 to propel the mill balls 32 in the chamber 22. Furthermore, the chamber 22 has a lid 34 for charging (feeding) and discharging of the superalloy scrap during milling, for continuous operation.

In one embodiment, the grinding is performed in air. In other embodiments, the chamber is tightly sealed, and the grinding of the superalloy scrap can be performed in a vacuum or in a protective atmosphere.

Furthermore, a process control agent (PCA) may be added to the chamber with the superalloy scrap. The process control agent (PCA) may prevent sticking of the superalloy scrap on the mill balls, on the inner wall of the cylindrical chamber, and on the impellers. Non-limiting examples of the process control agent may include stearic acid, zinc stearate, and the like. The process control agent (PCA) may be added in an amount greater than about 0.1 weight % of the superalloy scrap. In one embodiment, the amount of the process control agent (PCA) may vary from about 0.1 weight % to about 5 weight %, and in a preferred embodiment, from about 0.5 weight % to about 1 weight %.

Grinding of the superalloy scrap is carried out for a selected period of time with a rotational speed that depends, in part, on the size (or surface area) of the particles of superalloy scrap fed into the chamber, along with the desired size (or surface area) of the scrap after grinding. In some embodiments, the grinding of the superalloy scrap is carried out at a rotational speed of from about 1000 rpm to about 1400 rpm, and in some specific embodiments, from about 1200 rpm to about 1400 rpm. Furthermore, in some embodiments, the grinding is carried out for a period of time in a range from about 1 hour to about 8 hours, and in some specific embodiments, from about 2 hours to about 6 hours.

As discussed above, the grinding of the superalloy scrap by the high energy milling technique modifies the morphology of the superalloy scrap to a flaky morphology, to improve rhenium liberation kinetics. As used herein, the term "flaky morphology", is meant to describe the morphology of the superalloy scrap after grinding by the technique as discussed above. In some embodiments, the flaky morphology is a distribution of thin or flat particles, also termed as platelets, having a thickness in a range of from about 1 micron to about 5 microns, and further, having a largest dimension such that the ratio of the largest dimension (other than thickness) to the thickness dimension is greater than about 10. In some preferred embodiments, the thickness of the platelets is in a range of from about 1 micron to about 2 microns. These flat particles or platelets are usually irregular in shape.

Figure 3:
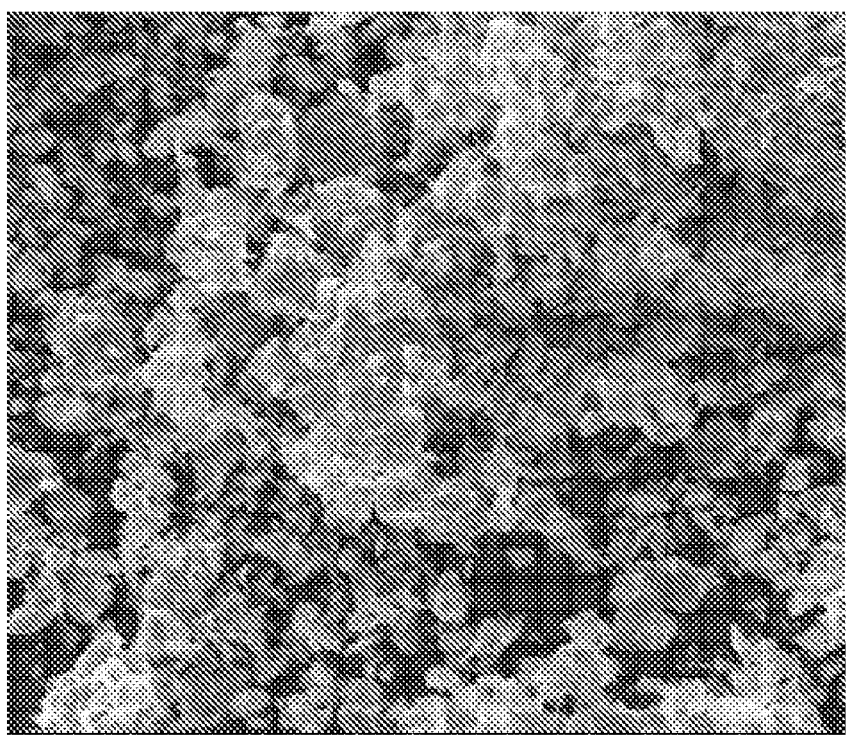
FIG. 3 is a scanning electron micrograph of superalloy scrap, having a morphology according to an embodiment of the present invention.

According to embodiments of the invention, the surface area of the scrap resulting after high-energy milling is increased from about 0.10 meter$^2$/gram to about 1.50 meter$^2$/gram. FIG. 3 illustrates a scanning electron micrograph of superalloy scrap after about 3.5 hours of attrition milling, according to one embodiment. The micrograph shows flaky morphology of the superalloy scrap of increased surface area, compared to as-received superalloy scrap.

The superalloy scrap of flaky morphology having increased surface area is used as the oxidation feedstock for recovery of the rhenium. This oxidation feedstock of flaky morphology is fired in a furnace in an oxidizing atmosphere, preferably air, oxygen, nitrogen, argon, ozone or a combination thereof. The oxidation feedstock of flaky morphology is fired at a sufficient temperature for a sufficient time to convert rhenium into volatile rhenium oxide. The conversion of rhenium to rhenium oxide is measured analytically. Usually, the vapors generated on oxidation of the feedstock are bubbled through a solution, and the solution is filtered to collect a residue. Analysis of the residue using XRD (x-ray diffraction) is used to identify the formation of rhenium oxide. Furthermore, ICP-MS (Inductively coupled plasma mass spectrometry) can be used to identify rhenium in the vapor. ICP-MS is a highly sensitive process that is capable of detecting a range of metals and, several non-metals, at very low concentrations.

Typically, firing temperatures may vary from about 600 degree Celsius to about 1000 degree Celsius, with a preferred range of from about 800 degree Celsius to about 1000 degree Celsius. The firing time may typically vary from about 4 hours to about 24 hours, with a preferred firing time of from about 5 hours to about 10 hours. The firing time depends on the firing temperature with the time being shorter at the higher temperatures.

The firing treatment causes the rhenium oxide to sublime and to then condense. After the firing treatment, the furnace is cooled, and the condensed rhenium oxide is recovered from the furnace. The rhenium oxide can then be processed by conventional methods, for example, by chemical reduction, and metallic rhenium can then be recovered. A method of recovery and refining of rhenium after oxidizing alloy scrap is discussed in an article "Recovery And Refining Of Rhenium, Tungsten And Molybdenum From W—Re, Mo—Re And Other Alloy Scraps" by B. Heshmatpour et. al. J., The Less-Common Metals, 86, pages 121-128 (1982), which is incorporated herein for reference.

Figure 5:
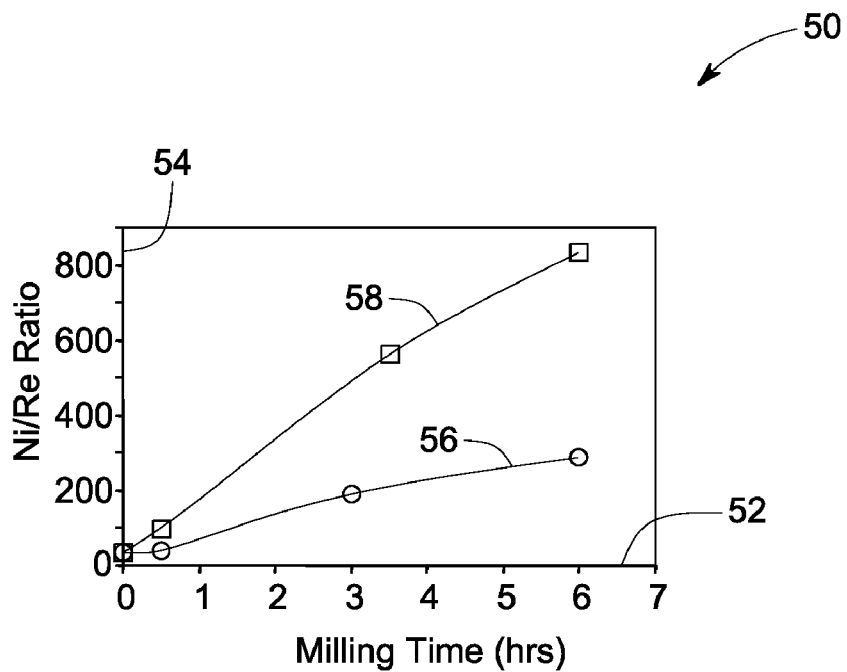
FIG. 5 shows a graph of Ni/Re ratio as a function of milling time, according to an embodiment of the present invention.

The amount of recovery of rhenium from the superalloy scrap may be measured by calculating the remaining rhenium in the oxidation feedstock (superalloy scrap) after oxidation. One way of calculating rhenium in the oxidized superalloy scrap is by analyzing the Ni/Re ratio that is shown in FIG. 5, and discussed in detail in example section.

It is frequently advantageous to modify the morphology of the oxidation feedstock of the superalloy scrap, to facilitate rhenium liberation during oxidation. Liberation of rhenium is improved, due to the increased surface area and reduced particle size for the flaky morphology of the oxidation feedstock. First, most of the rhenium is available on the surface of the platelets (particles) for oxidation, due to reduced dimensions of the platelets (particles). Secondly, even if some amount of rhenium is not available on the surface, rhenium atoms diffuse through a reduced diffusion distance, due to thin platelets, and are available for oxidation on the surface of the platelets. Thus, substantially all rhenium may be recovered by using the method of the present invention.

The time for oxidation of rhenium to rhenium oxide is controlled by the diffusivity of the rhenium atoms in the superalloy and the diffusion distance traveled by the rhenium atoms. The purpose of milling is to reduce the diffusion distance in at least one dimension, thereby enhancing the liberation kinetics. Diffusivities of rhenium at various temperatures may be used to find the time for a rhenium atom to diffuse to the surface of the particle (platelets). For example, one can assume a particle of Rene® N5 of a definite size, and calculate the time to diffuse for a rhenium atom at different temperatures. The particle of Rene® N5 is considered to be spherical in shape for simplicity, and thus, the diffusion distance would be equal to the radius of the particle.

Figure 4:
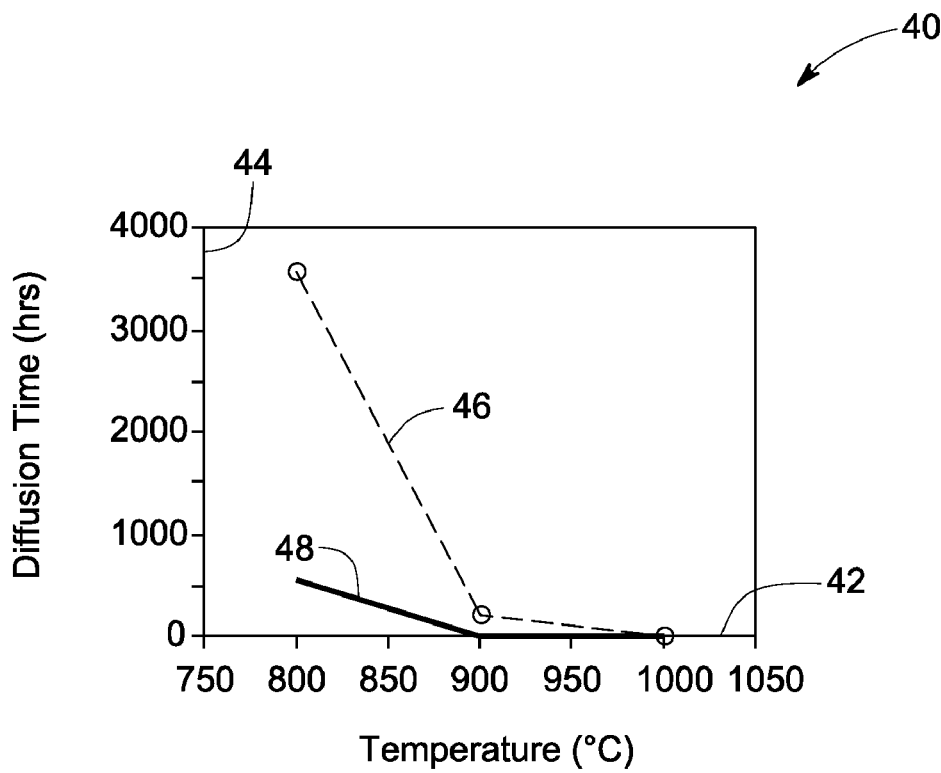
FIG. 4 shows a graph of rhenium diffusion time as a function of temperature, according to an embodiment of the present invention.

FIG. 4 illustrates a graph 40 showing the diffusion time for a rhenium atom with temperature and diffusion distance. The temperature is plotted on x-axis 42, and the diffusion time for the rhenium atom to the surface of the particle is plotted on y-axis 44. The diffusion distance is reduced from about 5 μm to about 2 μm, and the corresponding plots are shown by plot 46 and plot 48 respectively. It is evident from the graph that increasing the temperature of exposure and decreasing the diffusion distance can greatly reduce the diffusion time.

EXAMPLES

The examples that follow are merely illustrative, and should not be construed to be any sort of limitation on the scope of the claimed invention.

Example 1

0.15 kg of manufacturing scrap of a mixture of Rene®N6 and Rene®N5, containing particles of a size of about 50 microns, was ground in an attrition mill. Rene® N6 contains 5.4 wt % of rhenium, and Rene® N5 contains 3 wt % rhenium. Stearic acid was added to the scrap as a process control agent, at a level of 0.5 vol (wt) %. The grinding was performed with a rotational speed of about 1200 rpm for about 3.5 hours. FIG. 3, mentioned above, is a scanning electron micrograph of the superalloy scrap after grinding. The micrograph shows a flaky morphology of the ground superalloy scrap. After grinding, the average particle size of the superalloy scrap is reduced to about 5 microns, and the surface area of the scrap is increased from about 0.15 $m^2$/gram to about 1.41 $m^2$/gram. The scrap of flaky morphology (increased surface area) was oxidized by heating it in an alumina crucible under the flow of air, at 1000 degrees Celsius, for 3 hours in a tube furnace. Rhenium can be recovered from rhenium oxide by any suitable reduction processes, for example, electrochemical reduction. In some instances, the oxidation-based method for liberation of rhenium from the scrap material involved the use of a wet-scrubber, to collect the volatilized rhenium oxide. The rhenium product resulting from this technique comprised perrhenic acid.

Example 2

0.15 kg of manufacturing scrap of Rene®N6 and Rene®N5, as used in the above example, was ground in an attrition mill. Two samples of the scrap were made by adding stearic acid as a process control agent, at a level of 0.5 weight % and 3 weight %, respectively. The grinding was performed for each sample with a rotational speed of about 1200 rpm for about 0.5 hours, 3 hours and 6 hours. The samples of flaky morphology (increased surface area) after 0.5 hours, 3 hours and 6 hours grinding, were oxidized as discussed in example 1. FIG. 5 is a graph 50 showing Ni/Re ratios in the two samples after oxidation, as a function of the milling time. X-axis 52 shows the milling time and y-axis 54 shows the Ni/Re ratio in the superalloy scrap. Curves 56 and 58 correspond to samples having 0.5 weight % and 3 weight % stearic acid, respectively.

The presence of greater amounts of the process control agent enhanced the rhenium liberation, so that more rhenium was converted to rhenium oxide, which is evident by the increased Ni/Re ratio in the scrap with 3 weight % stearic acid. Moreover, an increase in the Ni/Re ratio with milling time for each sample is evidenced by the graph. The rhenium content in the superalloy scrap decreases after oxidation, as more of the rhenium is available for oxidation (with milling time).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of recovering rhenium from rhenium-containing superalloy scrap, comprising the steps of:
    forming an oxidation feedstock of flaky morphology by increasing the surface area of the superalloy scrap, wherein the flaky morphology comprises a distribution of thin or flat particles having a ratio of a largest dimension, other than thickness, to a thickness dimension, of greater than about 10; and
    oxidizing the oxidation feedstock of flaky morphology to convert rhenium into a voltile rhenium oxide,
    wherein the superalloy is a nickel-based superalloy.

2. The method of claim 1, wherein the nickel-based superalloy comprises both a gamma phase and a gamma-prime phase.

3. The method of claim 1, wherein the nickel-based superalloy comprises from about 1 weight percent to about 10 weight percent rhenium.

4. The method of claim 3, wherein the nickel-based superalloy comprises from about 2 weight percent to about 6 weight percent rhenium.

5. The method of claim 1, wherein the superalloy scrap comprises particles which have an average particle size greater than about 50 microns.

6. The method of claim 1, wherein forming the oxidation feedstock of the flaky morphology comprises grinding the superalloy scrap.

7. The method of claim 6, wherein grinding is carried out by a high energy milling technique.

8. The method of claim 7, wherein the high energy milling technique is selected from the group consisting of planetary milling, attrition milling, ball milling, airjet milling, pulveriser techniques, and a combination thereof.

9. The method of claim 6, wherein the grinding is carried out at a rotational speed of from about 1000 rpm to about 1400 rpm.

10. The method of claim 9, wherein the grinding is carried out at a rotational speed of from about 1200 rpm to about 1400 rpm.

11. The method of claim 6, wherein the grinding is carried out for a period of time in a range of from about 1 hour to about 8 hours.

12. The method of claim 11, wherein the grinding is carried out for a period of time in a range of from about 2 hours to about 6 hours.

13. The method of claim 1, wherein the flaky morphology of the oxidation feedstock comprises platelets having at least one dimension in a range from about 1 micron to about 5 microns.

14. The method of claim 1, wherein the surface area of the superalloy scrap is increased from about 0.10 meter$^2$/gram to about 1.50 meter$^2$/gram.

15. The method of claim 1, wherein oxidizing the superalloy feedstock is carried out in an oxidizing atmosphere selected from the group consisting of air, oxygen, argon, nitrogen, ozone and combinations of two or more thereof.

16. The method of claim 1, wherein the superalloy feedstock is oxidized at a temperature in a range of from about 600 degree Celsius to about 1000 degree Celsius.

17. The method of claim 1, further comprising recovering metallic rhenium by reducing the rhenium oxide.

18. A method of recovering rhenium from rhenium-containing superalloy scrap, the method comprising the steps of:
    forming an oxidation feedstock of flaky morphology by increasing the surface area of particles of the superalloy scrap, using a high-energy milling technique, wherein the flaky morphology comprises a distribution of thin or flat particles having a ratio of a largest dimension, other than thickness, to a thickness dimension, of greater than about 10; and
    oxidizing the oxidation feedstock of flaky morphology to convert rhenium into a voltile rhenium oxide,
    wherein the superalloy is a nickel-based superalloy.

* * * * *